(12) United States Patent
Nakamura

(10) Patent No.: US 7,864,475 B2
(45) Date of Patent: Jan. 4, 2011

(54) THERMALLY ASSISTED MAGNETIC RECORDING SYSTEM AND THERMALLY ASSISTED MAGNETIC RECORDING

(75) Inventor: Kimio Nakamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 12/216,722

(22) Filed: Jul. 10, 2008

(65) Prior Publication Data

US 2009/0015959 A1 Jan. 15, 2009

(30) Foreign Application Priority Data

Jul. 11, 2007 (JP) .............................. 2007-182094

(51) Int. Cl.
*G11B 5/02* (2006.01)
*G11B 27/36* (2006.01)
(52) U.S. Cl. .......................................... 360/59; 360/31
(58) Field of Classification Search .................. 360/59, 360/75, 39; 369/47.53, 13, 26, 13.27
See application file for complete search history.

(56) References Cited

U.S. PATENT DOCUMENTS

| | | | | |
|---|---|---|---|---|
| 5,949,747 | A * | 9/1999 | Miyashita et al. | 369/53.26 |
| 6,469,960 | B1 * | 10/2002 | Miyoshi | 369/13.27 |
| 6,650,599 | B2 * | 11/2003 | Takagi et al. | 369/13.27 |
| 6,741,527 | B2 * | 5/2004 | Okumura et al. | 369/13.26 |
| 7,227,818 | B1 * | 6/2007 | Toda et al. | 369/44.29 |
| 2006/0117333 | A1 * | 6/2006 | Taguchi et al. | 720/659 |

FOREIGN PATENT DOCUMENTS

| | | |
|---|---|---|
| JP | 2002-133602 | 5/2002 |
| JP | 2002-298301 | 10/2002 |
| JP | 2003-045004 | 2/2003 |
| JP | 2004-355739 | 12/2004 |

OTHER PUBLICATIONS

Chou et al., "Single-domain magnetic pillar array of 35nm diameter and 65 Gbits/in.$^2$ density for ultrahigh density quantum magnetic storage", J. Appl. Phys., 76 6673 (Nov. 1994).

* cited by examiner

*Primary Examiner*—Daniell L Negrón
*Assistant Examiner*—Regina N Holder
(74) *Attorney, Agent, or Firm*—Antonelli, Terry, Stout & Kraus, LLP.

(57) ABSTRACT

Heating power control is performed in thermally assisted magnetic recording using a patterned recording medium. Trial writing is performed by continuously changing a heating power intensity with respect to a pattern row of a trial writing area provided in plurality on the recording medium. From a reproduction signal thereof, a minimum heating power of recording that is a boundary power between recording and non-recording, and a maximum heating power of recording that is a boundary power between recording and a heating power by which recorded information of an adjacent pattern is deleted are determined to decide an optimum recording power.

14 Claims, 10 Drawing Sheets

THERMALLY ASSISTED MAGNETIC RECORDING SYSTEM AND THERMALLY ASSISTED MAGNETIC RECORDING

CLAIM OF PRIORITY

The present application claims priority from Japanese patent application JP 2007-182094 filed on Jul. 11, 2007, the content of which is hereby incorporated by reference into this application.

BACKGROUND OF THE INVENTION

1. Field of the Invention

The present invention relates to a thermally assisted magnetic recording system and a thermally assisted magnetic recording.

2. Description of the Related Art

In magnetic disk apparatuses which are one type of information recording system mounted on a computer or the like, an increase in recording densities has been required along with an increase in the amount of information to be processed. In order to increase the recording densities of magnetic disk apparatuses, magnetic recording has been increasingly reduced in dimensions, for example, by narrowing a distance between a magnetic disk and a magnetic head, reducing the particle size of magnetic particles constituting a magnetic recording layer of a magnetic recording medium, increasing a coercive force (anisotropy magnetic field) of a magnetic recording medium, or the like.

However, an increase in the magnetic field intensity of a magnetic recording head has a physical limit, which causes the increase in magnetic recording densities to be limited. In high-density recording, it is necessary to reduce the crystal grain size of a magnetic recording medium from the perspective of noise reduction. However, there occurs a problem that the magnetic particles become thermally unstable. Thus, in order to reduce the crystal grain size and also ensure the thermal stability, a magnetic anisotropy energy needs to be increased. The increase in the anisotropy energy, namely, the increase in the anisotropy magnetic field (coercive force) requires the increase in the head magnetic field intensity necessary for recording. However, due to the upper limit of saturation magnetization of a magnetic pole material used for a recording head and the narrowing limit of the distance between a magnetic disk and a magnetic head, it is difficult to further increase the anisotropy magnetic field and the magnetic field intensity from the recording head in the future in proportion as the recording densities become higher.

A magnetic recording method using a patterned recording medium (J. Appl. Phys., 76 6673 (1994), JP Patent Publication (Kokai) No. 2003-45004 or the like) is expected as one of the solutions for the above problems. In the method, a magnetic recording layer of a recording medium is patterned into a recording unit size and magnetic coupling in a pattern is strengthened to enhance durability against thermally magnetization decay in comparison with a conventional magnetic recording method in which a plurality of magnetic particles are employed as a recording unit.

Meanwhile, a thermally assisted magnetic recording technology in which an optical recording technology and a magnetic recording technology are combined has been proposed and is attracting attention. A mechanism for heating a medium is added in a magnetic recording/reproducing head used herein. At the recording time, the magnetic recording/reproducing head generates an application magnetic field and also heats a medium to reduce a medium coercive force. Accordingly, recording is easily performed on a medium having a high coercive force on which recording is difficult to perform by a conventional magnetic head due to an insufficient intensity of a recording magnetic field. The use of an optical head using a near field light as a heat source has been proposed to heat a micro region which is necessary for high-density recording (JP Patent Publication (Kokai) No. 2003-45004 or the like).

Furthermore, a high-density magnetic recording method in which the patterned recording medium is combined with the thermally assisted magnetic recording method has been also proposed (JP Patent Publication (Kokai) No. 2004-355739 or the like). Durability against thermally magnetization decay is higher and further higher densities are easier to obtain also in the thermally assisted magnetic recording method by employing one pattern in which magnetic coupling is strengthened as a recording unit than employing a recording unit constituted by a plurality of magnetic particles.

A mechanism for controlling a recording temperature is required in the thermally assisted magnetic recording. If a recording temperature is low due to a low recording heating power, the coercive force of a recording material is not sufficiently lowered and magnetic recording is not performed. On the other hand, if a recording temperature is high due to an excessive recording heating power, a temperature distribution is expanded and there is a possibility that information that has been already recorded adjacent to a recording position is rewritten. Since a medium heating temperature at the recording time changes depending on an individual difference of heat source element or recording material, variations in frying height when mounted on a slider head, variations in ambient temperature or the like, it is necessary to control the medium temperature at the recording time to have an optimum temperature increase by adjusting the recording heating power. A method of controlling a light intensity by detecting a light intensity from a light source by a photodetector, and suppressing variations in medium heating temperature at the recording time is described in JP Patent Publication (Kokai) No. 2002-133602. Also, JP Patent Publication (Kokai) No. 2002-298301 describes a method of performing trial recording in a specific area and controlling a heating power by comparison of recording data and reproduction data thereby in order to control variations in medium heating temperature at the recording time caused by a difference in linear velocity between the inner periphery and the outer periphery of a disk.

SUMMARY OF THE INVENTION

The methods of controlling a heating power described above are the same as a power method of controlling the power of a semiconductor laser as a heating source, which has been put to practical use in an optical recording disk system such as DVD or the like, but a thin-film recording medium having continuous recording units in a plane as a conventional recording medium form is assumed herein. Thus, the above methods are not effective in a patterned recording medium having a recording layer in which pattern-like recording units are formed. That is, in magnetic recording using the patterned recording medium, a recording modulation degree and a jitter response with respect to a laser recording power are totally different from those of the continuous medium, and thus, a new index for suppressing variations in recording temperature and optimizing a recording power is required.

Furthermore, in order to perform recording power control on the patterned recording medium, it is also necessary to consider variations in pattern size and magnetic properties thereof. Due to the variations, when recording is performed at a constant magnetic field, there is a possibility that magnetization switching accompanying recording does not occur in a pattern having a high magnetization switching magnetic field and magnetization switching occurs in a pattern having a small magnetization switching magnetic field due to a magnetic field leaking from a head which performs recording on an adjacent track. The variations in pattern size are generated in the manufacturing process of the patterned recording medium. Thus, as the pattern size becomes smaller, a variation ratio with respect to a pattern interval is increased, and the above problem becomes greater.

An object of the present invention is to provide a thermally assisted magnetic recording system and a thermally assisted magnetic recording for performing heating power control in thermally assisted magnetic recording using a patterned recording medium, suppressing the influence of variations in pattern size and enabling to increase recording densities.

A thermally assisted magnetic recording system according to the present invention uses a patterned recording medium having a magnetic recording layer in which recording units magnetically separated from each other are arranged along a track, and decides an optimum heating power for recording user data by trial writing. A plurality of trial writing areas are provided on the recording medium. A recording magnetic field is applied to perform trial writing while monotonically changing a heating power intensity with respect to a recording unit row in the trial writing area. From a reproduction signal obtained by reproducing the trial writing area, a minimum heating power of recording that is a boundary power between recording and non-recording, and a maximum heating power of recording that is a boundary power between recording and a heating power by which recorded information of an adjacent pattern is deleted are determined to decide the optimum heating power.

Also, a thermally assisted magnetic recording system according to the present invention uses a patterned recording medium in which a magnetic recording layer in which recording units magnetically separated from each other are arranged along a track is provided, the track is divided into a plurality of sectors each having a header portion and a data recording area, and trial writing is performed in advance in a trial writing area provided in the header portion of the sector. New trial writing is performed in a heating power learning area in which trial writing is performed in advance, and a heating power by a light source is controlled such that a reproduction signal of the advance trial writing and a reproduction signal of the new trial writing correspond to each other to reconstruct a heating condition at the time of the advance trial writing. When user data is recorded in a desired sector, an optimum heating power of the light source is decided based on a reproduction signal obtained by reproducing trial writing performed in advance in a header of the sector. In this case, it is not necessary to perform trial writing every time in a trial writing area of the sector in which user data is to be recorded.

DESCRIPTION OF SYMBOLS

Figure 1:
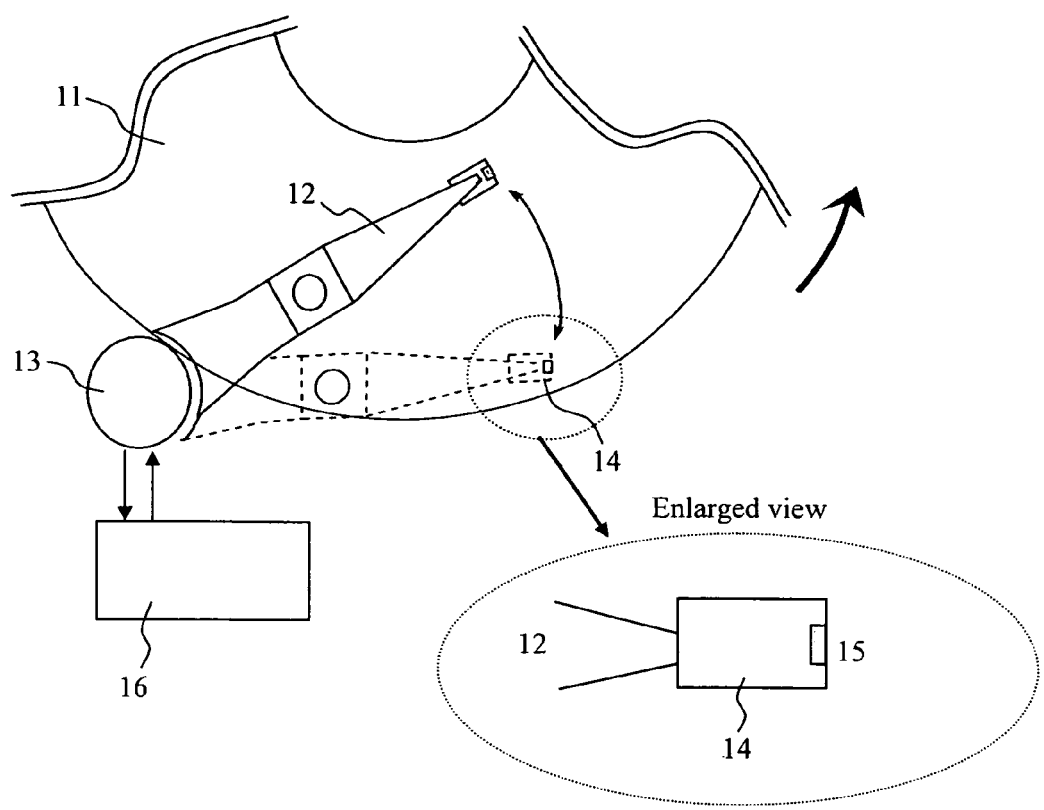
FIG. 1 is a schematic view of a magnetic disk apparatus.

11 ... Magnetic disk
12 .... Carriage
13 .... Voice coil motor
14 .... Slider
15 .... Magnetic head
16 .... Control circuit system
21 .... Reproducing element
22 .... Magnetic recording element
23 .... Near field light source
24 .... Light introduction system
25 .... Single magnetic pole magnetic head
26 .... Coil
31 .... Semiconductor laser
33 .... Optical coupler
34 .... Optical fiber
35 .... Coupler lens
51 .... Track
52 .... Header signal area
53 .... Trial writing area
54 .... Data recording area
91 .... Track
92 .... Header signal area
93 .... Advance trial writing area
94 .... Learning recording area

DETAILED DESCRIPTION OF THE PREFERRED EMBODIMENTS

Embodiments of the present invention will be described below.

FIG. 1 is a schematic view illustrating the configuration of a magnetic disk drive according to the present invention. Main components inside the magnetic disk drive include a magnetic disk 11 mounted on a spindle to be rotated and driven, a slider 14 and a magnetic head 15 mounted on a carriage 12 to access any track by a voice coil motor 13 and record/reproduce information on the magnetic disk (medium), and a control circuit system 16 for controlling data input/output, recording/reproduction, and an actuator. The magnetic disk 11 is a patterned recording medium having a magnetic recording layer in which recording units magnetically separated from each other are arranged along a track.

Figure 2:
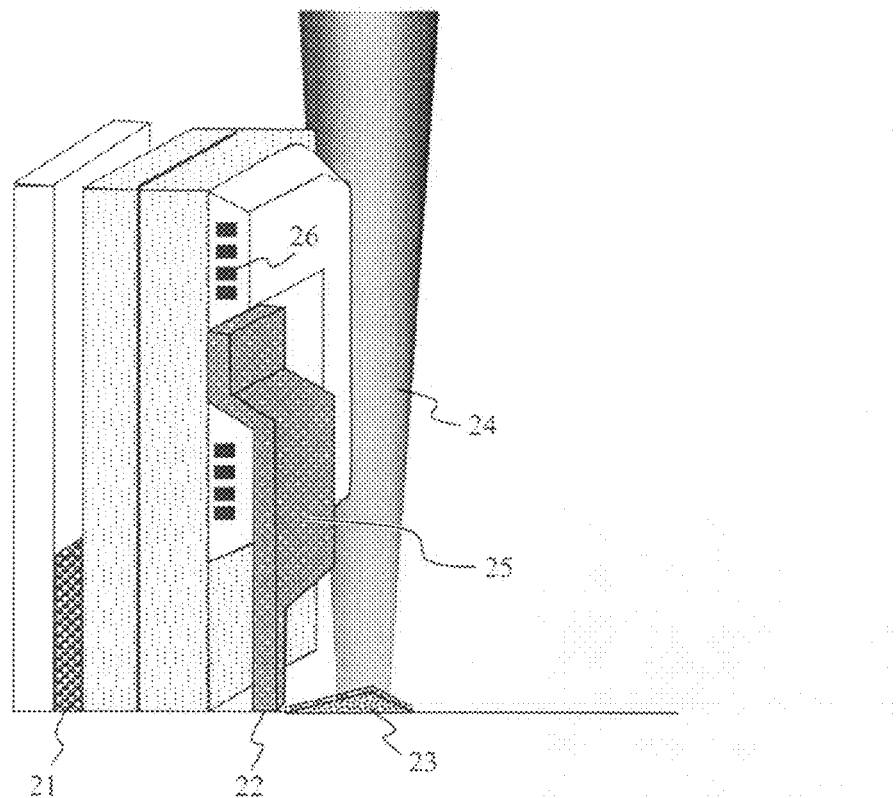
FIG. 2 illustrates a configuration example of a thermally assisted magnetic recording head.

As shown in FIG. 2, main components inside the slider head include a reproducing element 21, a magnetic recording element 22, and a near field light source 23 and a light introduction system 24 for generating a micro recording heat source. The reproducing element 21 is formed of a magnetoresistance effect element. The magnetic recording element 22 is a single magnetic pole magnetic recording head 25 for generating a recording magnetic field by an electric current applied to a coil 26, and generates a magnetic field in a vertical direction having a maximum value of 10 KOe in a near field light region.

Figure 3:
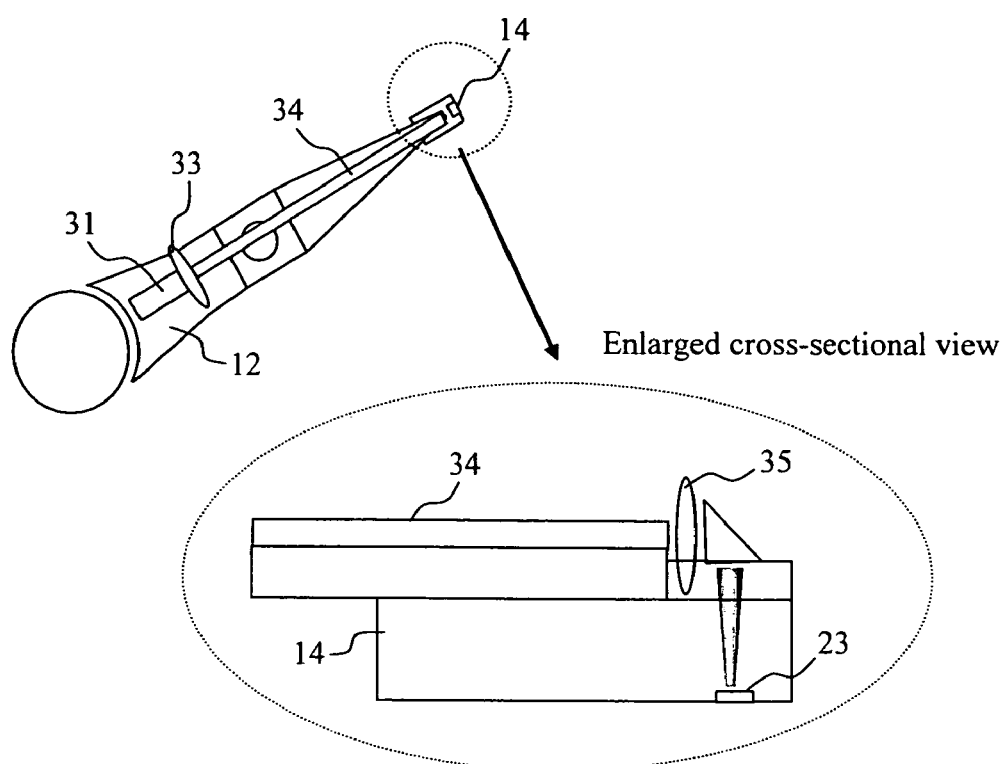
FIG. 3 is a configuration diagram of a light introduction system.

As shown in FIG. 3, a light source constituted by a semiconductor laser 31 is arranged on the carriage 12 and a light is guided through an optical coupler 33, an optical fiber 34, and a coupler lens 35 on the slider 14 to the near field light source 23. The near field light source 23 is an antenna-type gold thin-film element for generating a near field light in a micro region by using a plasmon resonance. A near field light having a spatial expanse with a half width of 50 nm or less is thereby generated. The semiconductor laser of the light source may be mounted on the slider. A waveguide may be used for introducing a light to the near field light source.

Figure 4A:
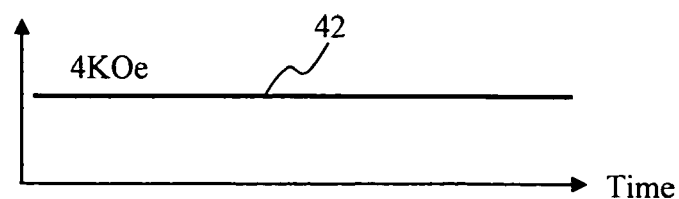
FIG. 4 is an explanatory view of a heating power controlling method.
Figure 4B:
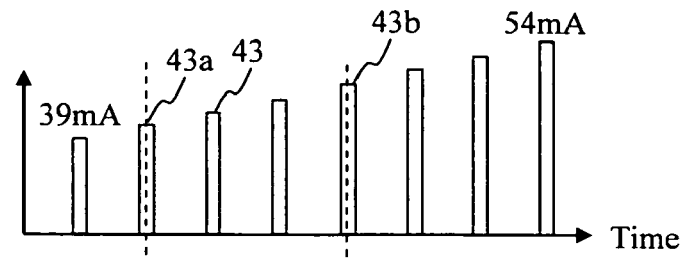
Figure 4C:
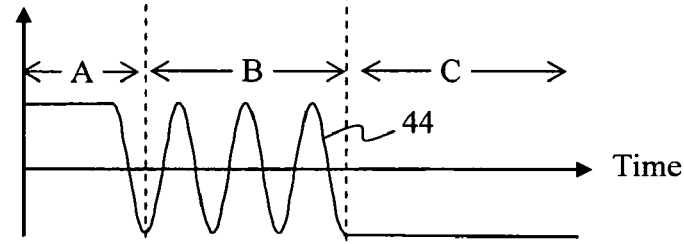
Figure 4D:
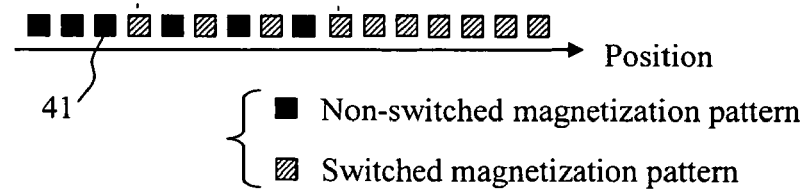

Next, how an optimum value of a heating power that is the amplitude of an output pulse light from the semiconductor laser is obtained by trial writing onto a pattern in a trial writing area will be described. FIG. 4 illustrates a medium pattern (recording unit row) and a recording waveform of a trial writing area provided on the recording medium. FIG. 4(A) illustrates the amplitude of a recording magnetic field, FIG. 4(B) illustrates the amplitude of a recording signal (the amplitude of a laser diode drive current), FIG. 4(C) illustrates the amplitude of a reproduction signal, and FIG. 4(D) illustrates a medium pattern of the trial writing area. The time axes of FIGS. 4(A) to (C) and the position axis of FIG. 4(D) correspond to each other through the relative speed of the head and the recording medium. Also, the horizontal axis positions of FIG. 4(A) to FIG. 4(D) correspond to each other therein.

Since the patterned recording medium is used, the medium pattern of the trial writing area is constituted by a row of recording units 41 magnetically separated from each other like a medium pattern of a user data recording area. The recording waveform is constituted by a magnetic field waveform 42 and an output light waveform 43 of the semiconductor laser for providing a medium heating power. In the trial writing according to a present embodiment, a recording magnetic field is applied at a constant amplitude, and an output light of the semiconductor laser is set to have a pulse waveform and the amplitude thereof is changed to monotonically increase at a predetermined increasing rate. The cycle of the output light pulse is set to be twice the arrangement cycle of the recording units 41.

If the heating power of the light emitted to the recording units 41 of the trial writing area is insufficient, a heating temperature increase is low, and thus, the magnetization of the recording unit is not switched. On the other hand, if the heating power is excessive, a heated area is expanded to thereby switch the magnetization of an adjacent recording unit. Accordingly, an intermediate heating power between the above powers is an optimum power. That is, by performing recording in the trial writing area while increasing the amplitude of the heating power with time, and subsequently obtaining a reproduction signal 44, the heating power can be separated into the following three ranges.

(1) Range A with an insufficient heating power in which a switching signal cannot be obtained (2) Range B with an optimum heating power for recording in which a modulation signal having a cycle twice the arrangement cycle of the recording units corresponding to a recording signal (3) Range C with an excessive heating power in which a heated area is expanded and the magnetization of an adjacent recording unit is also switched In other words, when a minimum heating power 43a by which recording can be performed and a maximum heating power 43b of recording by which recorded information of an adjacent pattern is not deleted are detected, an intermediate heating power between the minimum heating power 43a and the maximum heating power 43b is an optimum heating power for recording.

The trial writing area is provided in plurality on the recording medium. The trial writing area is also provided in a header portion or the like of a section in which recording areas hold together sectioned by a sector or a zone. Since variations in medium pattern size are generated in the manufacturing process of a disk, a variation distribution locally exists. Therefore, by specifying a sector or a zone, performing power control in a header portion thereof and setting an optimum laser drive current according to the degree of the variation distribution, it is possible to suppress the influence of the variations in pattern size on recording. It is also possible to control an output light power of the laser for causing the temperature increase of the recording medium at the recording time to be constant even if a linear velocity is different depending on a radius position on the disk.

Figure 5:
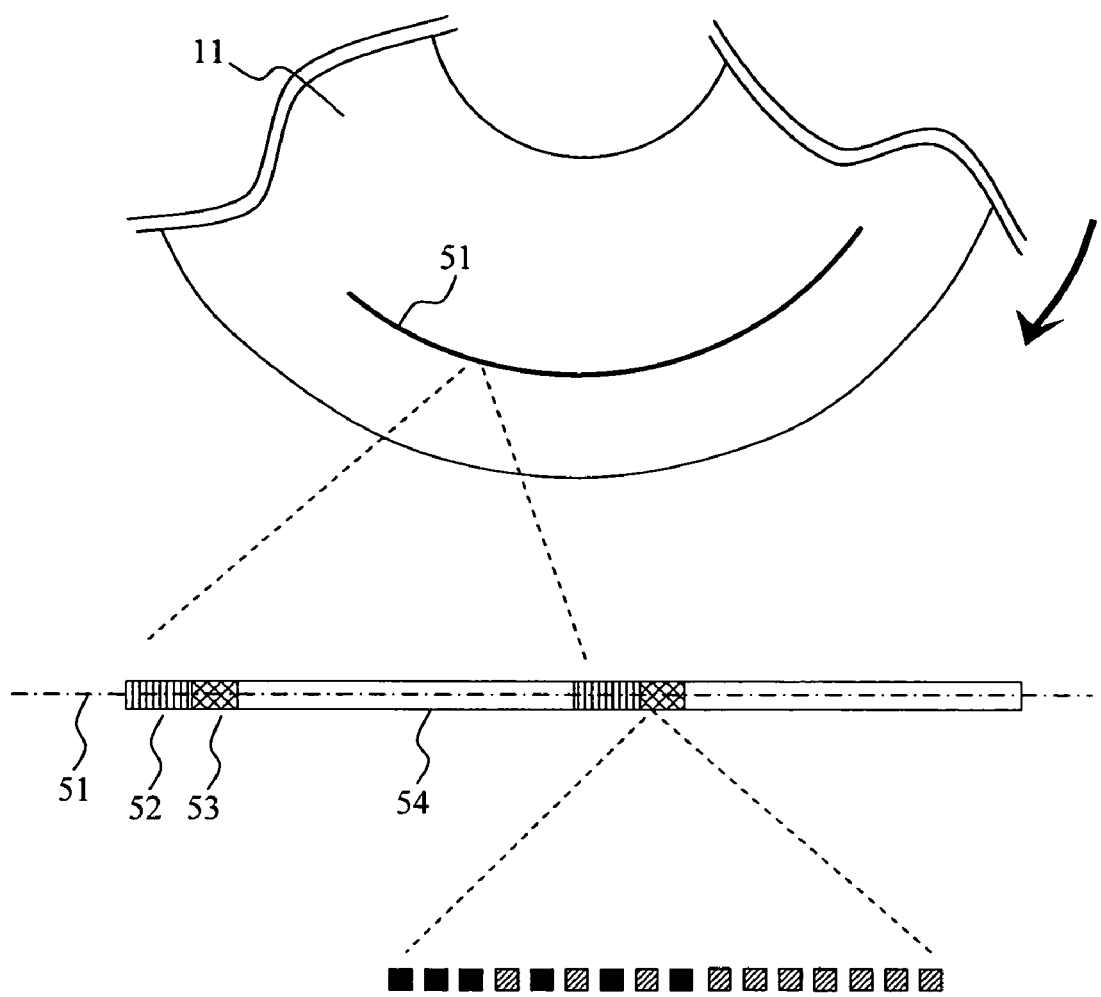
FIG. 5 is a schematic view illustrating one example of a patterned recording medium according to the present invention.

FIG. 5 is a schematic view illustrating one example of the patterned recording medium according to the present invention. An FeNiPt alloy thin film having a film thickness of 10 nm is provided on a glass substrate having a diameter of 2.5 inches. The alloy thin film is processed using electron lithography to form a magnetic recording layer in which a square-shaped FeNiPt alloy thin film dots having one side of 40 nm as the recording units are arranged in a track direction at a cycle of 60 nm. In the patterned recording medium having the magnetic recording layer, an area having a length obtained by dividing one track 51 into 40 portions is employed as a sector, and a header signal area 52 in which a header signal pattern such as a servo, an address, a clock or the like is recorded is provided in a header portion of each sector. A trial writing area 53 for power control is provided next. A data recording area 54 for recording user data follows next. According to a thermal diffusion simulation of the patterned recording medium, a temperature increase of 350° C. by which recording can be performed by a recording magnetic field of 4 KOe is expected to be obtained by a heating power of 0.6 mW by a pulse of 1 ns. In the optical head in the present embodiment, the efficiency of the output light power of the semiconductor laser with respect to the medium heating power is about 5%.

Figure 6:
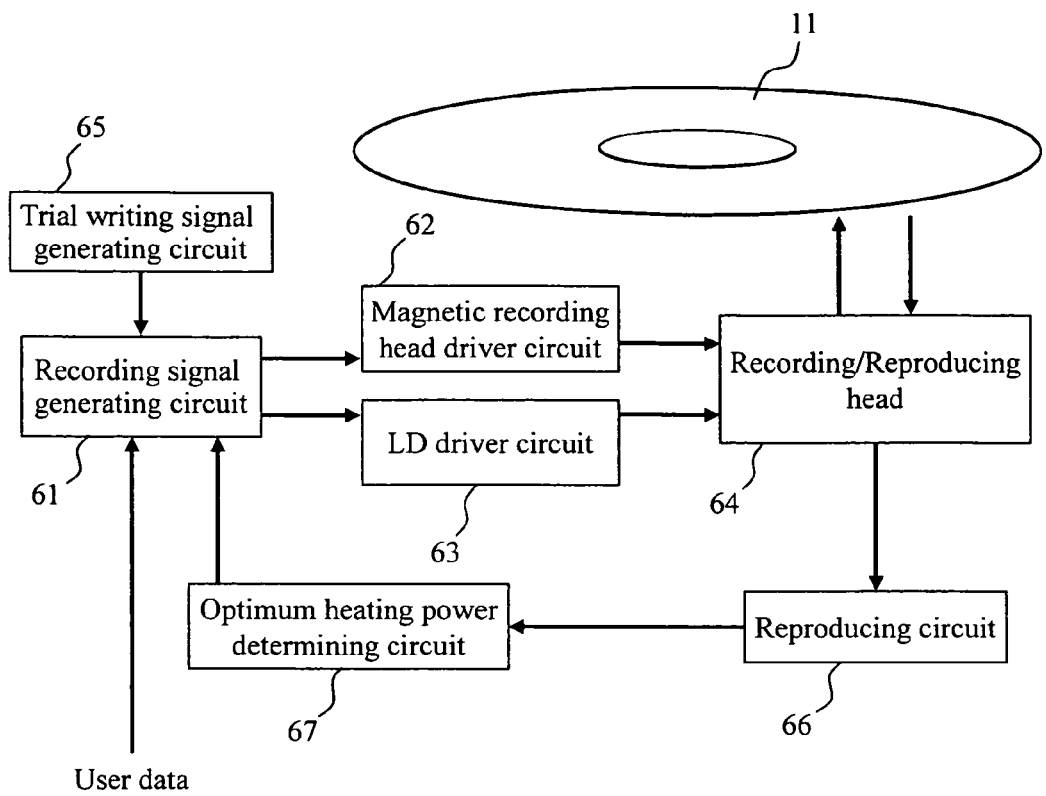
FIG. 6 is an entire view of a system.

FIG. 6 is an entire view of a system. Recording data is converted to pulse data in a recording signal generating circuit 61, and is transmitted to a magnetic recording head driver circuit 62 and an LD driver circuit 63. A recording magnetic field and a heating power are generated in a recording head of a recording/reproducing head 64 by the two driver circuits, and recording is performed on a patterned recording medium 11. In the case of trial writing for deciding a heating power by the semiconductor laser, pulse data and amplitude data thereof for driving the semiconductor laser are generated in the recording signal generating circuit 61 based on a signal from a trial writing signal generating circuit 65. Recording data is transmitted to the magnetic recording head driver circuit 62 and the LD driver circuit 63. The recording head is driven and recording is performed on a trial writing area of the patterned recording medium 11. Subsequently, a signal of the reproducing head with respect to the trial writing area is reproduced by a reproducing circuit 66. An optimum heating power is determined by an optimum heating power determining circuit 67 based on the reproduction signal, and a signal amplitude for driving the recording head is decided.

Figure 7:
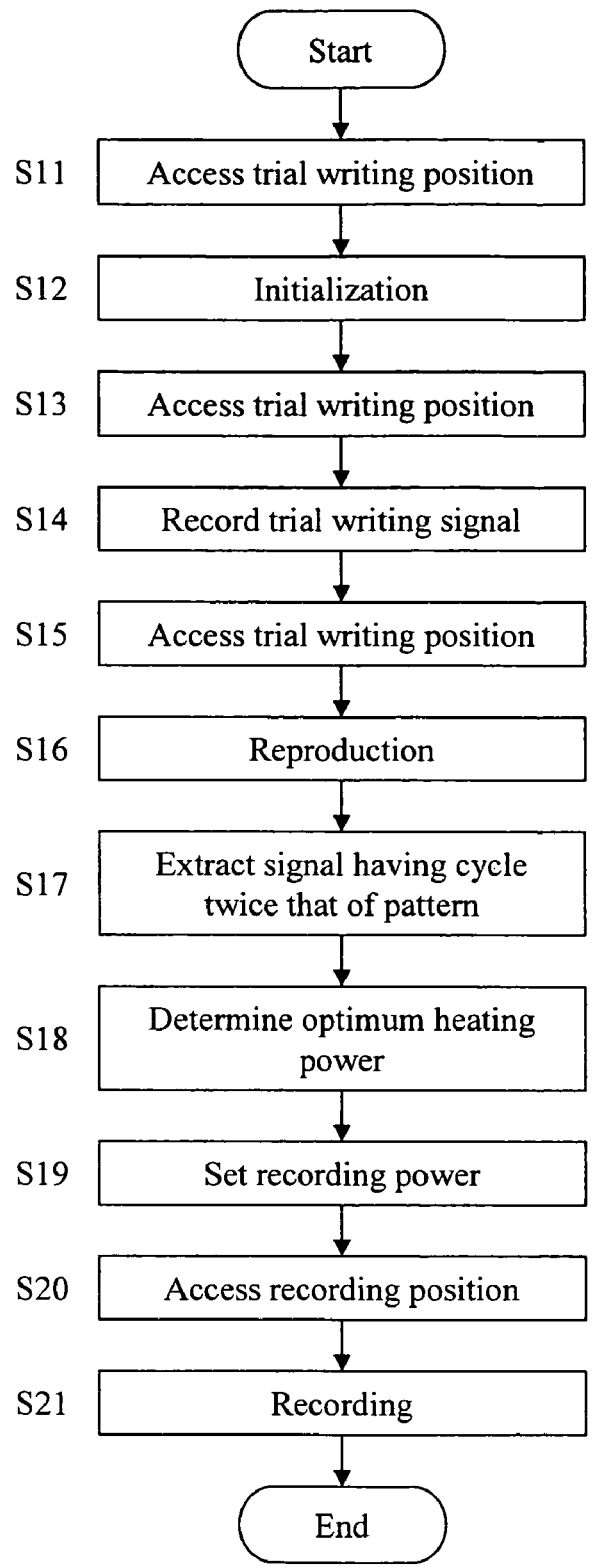
FIG. 7 explains a procedure for heating power control.

FIG. 7 illustrates a procedure in which the optimum heating power is decided by trial writing, the semiconductor laser is power-controlled and user data is recorded. When receiving a writing request of user data, the magnetic recording system accesses a predetermined sector position (S11). First, the magnetic recording system deletes a medium pattern of a trial writing area of the sector to initialize a magnetization state in a first rotation (S12). Next, the magnetic recording system accesses the sector again in a second rotation (S13) and performs trial writing on the initialized trial writing area (S14). At this time, the drive current amplitude of the semiconductor laser of the trial writing is caused to have a waveform changed from 39 mA to 54 mA and the recording magnetic field is maintained constant at 4 KOe as shown in FIG. 4, for example. In a third rotation, the magnetic recording system accesses the position on which the trial writing is performed (S15), and reproduces the trial writing area (S16). Next, the timing when a modulation signal having a cycle twice the arrangement cycle of the recording units appears in a reproduction signal is extracted (S17). The optimum heating power is determined based on the timing when the modulation signal having a cycle twice the arrangement cycle of the recording units appears and disappears (S18), and the optimum heating power is set as the current amplitude for driving the LD (S19). For example, by making description based on the example of FIG. 4, 16 recording units of the header portion of the sector are employed as a recording unit row for power control. The modulation signal can be obtained in the fourth to eighth recording units. Therefore, a laser output of from 43 mA to 47 mA in a changed laser output range of from 39 mA to 54 mA can be determined to be the laser drive current by which recording can be performed, and 45 mA that is the central value thereof is set as the laser drive current amplitude by which the optimum heating power can be obtained. Subsequently, the system accesses a recording area of the sector next to the header (S20), and records user data by the set recording laser output (S21).

The number of trial writing areas arranged on one track can be adjusted according to the degree of the variations in medium pattern size. In a medium disk having small variations, the trial writing area may be provided in each zone in which a plurality of tracks hold together.

In the procedure of FIG. 7, the rotation of the deletion and the trial writing is performed upon reception of the writing request of user data. However, the operations may be performed in advance in the state in which no writing request of user data is received, that is, as a background operation of the system. Accordingly, when receiving a writing request of user data, the magnetic recording system can immediately access a position where the trial writing was performed by the background operation, and determine the optimum recording power to perform recording. The time to start recording can be reduced in comparison with the procedure of FIG. 7. In the case where a system temperature increases or decreases from a system temperature at the time of recording learning, a learning operation is performed again since the optimum recording power is different depending on variations in temperature.

In the procedure of FIG. 7, the recording magnetic field is set to have a constant amplitude, and only the amplitude of the laser is modulated. However, the optimum recording power may be set by modulating the recording magnetic field amplitude to detect the heating power by which recording can be performed and the heating power by which recorded information of an adjacent pattern is deleted as in the present embodiment. The pattern on which trial writing is performed is reproduced and the optimum heating power is determined from a range of a recording condition by which a reproduction signal having a normal cycle can be obtained as the range B of 44 in FIG. 4(C). For example, by setting an upper limit recording power by which the reproduction signal having a normal cycle can be obtained to a maximum recording power, a specified multiple number thereof can be set as the optimum recording power. The value of the specified multiple number can be checked at the time of designing the system. In the present embodiment, about 80% of the maximum recording power is the optimum recording power, and the specified multiple number is acceptable with small variations with respect to an ambient temperature and a recording speed. Accordingly, the initializing operation described in the procedure of FIG. 7 can be omitted.

By performing the trial writing and deciding the optimum heating power before recording user data, thermally assisted magnetic recording can be performed under optimum conditions for the recording area by compensating variations in pattern dimensions and magnetic properties, a difference in linear velocity depending on a disk radius, and variations in ambient temperature and semiconductor laser.

In the above embodiment, it is necessary to perform the trial writing in association with the recording operation, and to rotate the disk two or more times for recording. In an embodiment described in the following, a recording medium on which trial writing is performed in advance is used to omit the trial writing immediately before recording described above and recording is performed by rotating a disk only once when a user performs recording.

In the present embodiment, the advance trial writing is assumed to be performed before shipment of the system or at the time of formatting after the shipment. In a patterned recording medium, two types of areas in which trial writing is to be performed are provided and trial writing is performed in advance under the same conditions in the both areas. The first area is a plurality of trial writing areas positioned in the header portion of the sector or the zone on the disk as in the above embodiment, which are used for determining the optimum heating power with respect to a different position on the disk. The second area is a heating power learning area for adjusting the LD drive current amplitude in order to reconstruct a heating condition at the time of the advance trial writing. The recording heating power is different due to temperature variations, temporal changes of the LD and the optical system, or the like even if the LD drive current amplitude is the same. Thus, the LD drive current amplitude is changed from a value at the time of the advance trial writing to perform learning such that a heating power equal to that at the time of the advance trial writing can be obtained. An electric current is added to a pulse train in FIG. 4(B) in which the LD drive current monotonically changes. The adding amount is changed to perform recording, and the current amplitude adding amount is learnt such that the reproduction signal from the pattern on which the trial writing is performed in advance corresponds thereto. When recording is performed upon reception of a writing request of user data, the pattern on which the trial writing is performed in advance in the trial writing area is reproduced. The LD drive current amplitude providing the optimum heating power obtained from the reproduction signal is corrected by the learnt current amplitude adding amount learnt in the heating power learning area to obtain the optimum LD drive current amplitude.

The learning operation of the LD drive current amplitude in the heating power learning area is performed every time the recording system is started up, when variations in ambient temperature exceeds a specified value, or when a recording error exceeds a specified value.

Figure 9:
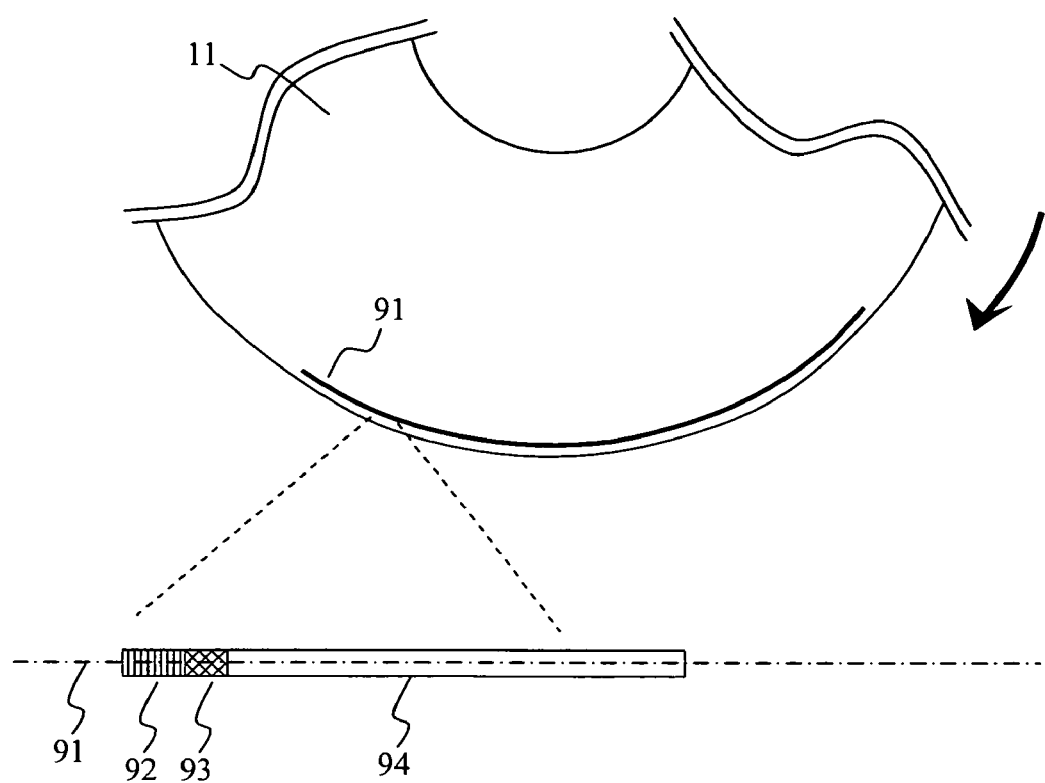
FIG. 9 explains a heating power learning operation.

The heating power learning area is divided into a pattern area on which the advance trial writing is performed, and a pattern area used for the learning operation, and is provided in a specific place such as the inner periphery or the outer periphery of the disk as shown in FIG. 9. In the areas, an advance trial writing area 93 is not rewritten but a learning recording area 94 is repeatedly rewritten until the learning is completed. Also, by setting the learning recording area to be longer than the trial writing area, a plurality of trial writings in which the current amplitude adding amount is changed can be performed in one rotation and the trial writings are reproduced in a second rotation to find the same current amplitude adding amount as the reproduction signal from the advance trial writing pattern. The required time for learning can be thereby reduced.

Figure 10A:
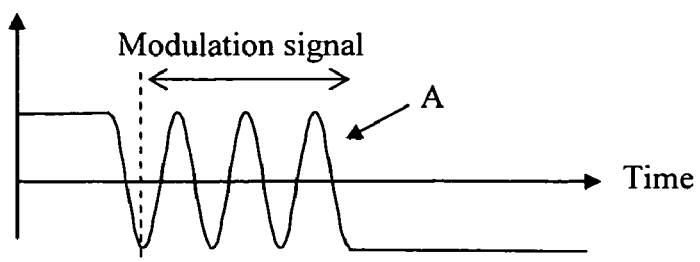
FIG. 10 explains a heating power learning area.
Figure 10B:
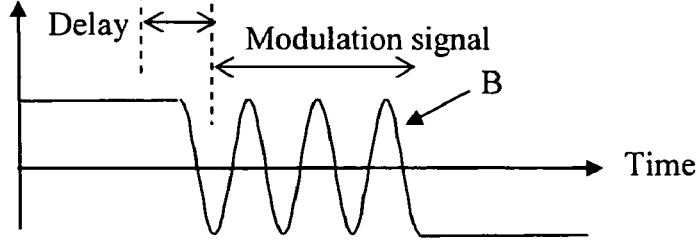
Figure 10C:
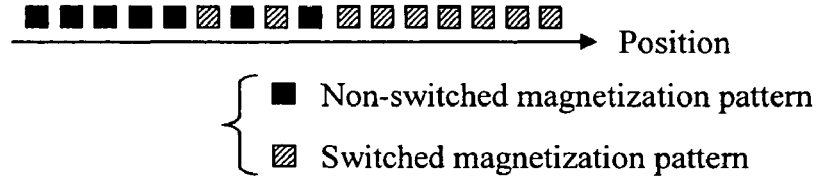

FIG. 10 illustrates one example of the learning operation of the LD drive current amplitude in the heating power learning area according to the present embodiment. The trial writing pattern and the recording condition of the heating power learning area are the same as those of the trial writing shown in FIG. 4. FIG. 10(A) is a schematic view illustrating a reproduction signal of a pattern on which trial writing is performed in advance, FIG. 10(B) is a schematic view illustrating a reproduction signal of a pattern on which trial writing is performed in the learning recording area for learning the drive current amplitude, and FIG. 10(C) is a schematic view illustrating a recording state of the trial writing area corresponding to the reproduction signal in FIG. 10(A). Reproduction waveforms in FIGS. 10(A) and (B) are different since the ambient temperature at the time of trial writing is changed. The ambient temperature of trial writing performed in advance is 25° C. and the ambient temperature at the time of learning is 50° C. When the ambient temperature rises, a luminous power with respect to the LD drive current amplitude, namely, a luminous efficiency is lowered, and thus, an LD drive current having a higher amplitude is required. By comparing the reproduction waveforms, it can be determined that a signal of the advance trial writing can be reproduced by adding 10 mA to the current amplitude at the time of learning. Accordingly, when recording is performed upon reception of the writing request of user data, the pattern on which trial writing is performed in advance in the trial writing area is reproduced, and the LD drive current amplitude for providing the optimum heating power obtained from the reproduction signal is added with 10 mA to perform recording.

Figure 8:
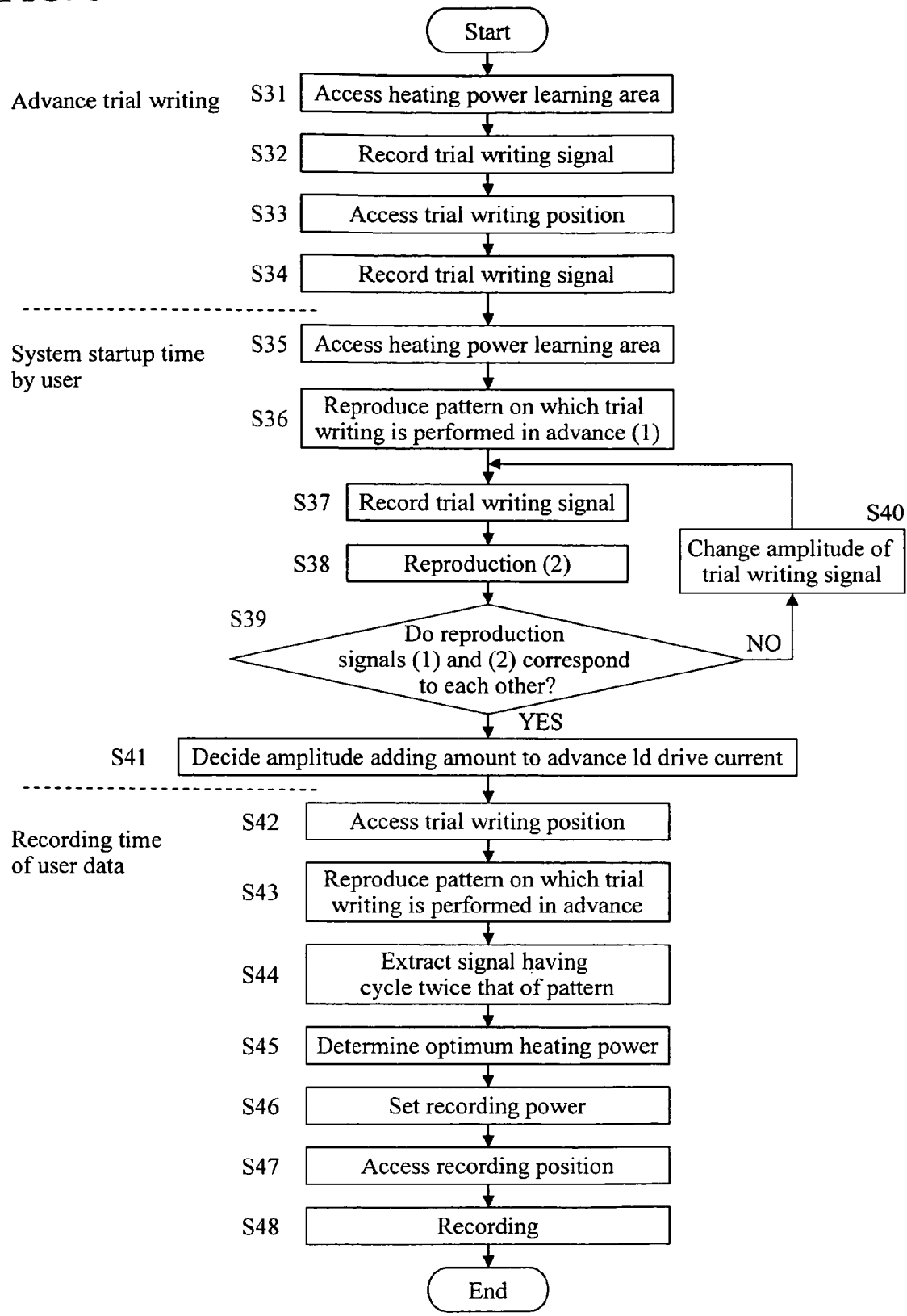
FIG. 8 explains a procedure for heating power control.

A recording procedure according to the present embodiment will be described with reference to FIG. 8. In the procedure shown in FIG. 8, the steps 31 to 34 are the advance trial writing performed only once before shipment of the system or at the time of formatting after the shipment. The steps 35 to 41 are executed when a user starts up the system. Also, the steps 42 to 48 are executed at the time of recording user data.

First, at the time of the advance trial writing, the heating power learning area provided in a predetermined track in the inner periphery or the outer periphery of the disk is accessed (S31), and a trial writing signal is recorded (S32). Similarly, the trial writing area provided in the header portion of the sector or the zone is accessed (S33), and a trial writing signal is recorded (S34). The trial writing signal as shown in FIG. 4, for example, is used to record the trial writing signal on the heating power learning area and the plurality of trial writing areas under the same conditions.

When a user starts up the magnetic recording system, the system accesses the heating power learning area (S35), and reproduces a recording unit row on which the trial writing is performed in advance (S36). Next, the system records a trial writing signal in the learning recording area of the heating power learning area (S37), and reproduces the signal (S38). The two reproduction signals are compared (S39), and when the both signals do not correspond to each other, the current signal amplitude of the trial writing signal to be recorded in the learning recording area is changed (S40), the recording and reproduction is performed again (S37, S38), and the signal comparison is repeated. The LD drive current amplitude adding amount for causing the present trial writing heating power to correspond to the heating power used in the advance trial writing is thereby obtained (S41). That is, when the LD drive current amplitude learnt in the heating power learning is used, the recording state of the advance trial writing in the plurality of trial writing areas on the patterned recording medium can be reconstructed.

Upon reception of a writing request of user data, a desired recording position is accessed (S42), and the advance trial writing signal in the header area thereof is reproduced (S43). Next, the timing when a modulation signal having a cycle twice the arrangement cycle of the recording units appears in the reproduction signal is extracted (S44), and the optimum heating power of the advance trial writing is determined based on the timing when the modulation signal having a cycle twice the arrangement cycle of the recording units appears and disappears (S45) as in S16 to S18 in FIG. 7. Thereafter, the LD drive current amplitude is corrected based on the LD drive current amplitude adding amount decided in S41, and the LD drive current amplitude for providing the optimum recording power is decided (S46). After that, the recording position next to the trial writing position is accessed (S47) and user data is recorded (S48).

The present invention is described above using the example in which the recording magnetic field amplitude is maintained constant and the cycle of the output light pulse of the heating laser is set to be twice the pattern cycle of the patterned recording medium. However, the present invention is not necessarily limited to the example. For example, the recording magnetic field may be switched and applied in synchronization with the heating laser pulse. The cycle of the laser pulse may be set to a cycle different from the cycle twice the pattern cycle of the patterned recording medium, for example, to a cycle three times or more the pattern cycle of the patterned recording medium.

What is claimed is:

1. A thermally assisted magnetic recording system comprising:
a patterned recording medium having a magnetic recording layer in which recording units magnetically separated from each other are arranged along a track and a trial writing area;
a thermally assisted magnetic recording head on which a magnetic recording head for applying a recording magnetic field to the patterned recording medium, a heating mechanism for heating a portion of area of the patterned recording medium by an output light from a light source, and a reproducing head are mounted;
a unit that controls a heating power by the light source; and
a unit that applies a recording magnetic field from the magnetic recording head to perform trial writing while monotonically changing the heating power by the light source with respect to a row of the recording units of the trial writing area, that determines (1) a minimum heating power of recording that is a boundary power between a heating power of recording and a heating power of non-recording, and (2) a maximum heating power of recording that is a boundary power between a heating power of recording and a heating power by which recorded information of an adjacent pattern located in a direction along the track is deleted, from a reproduction signal obtained by reproducing the trial writing area by the reproducing head, and that decides the heating power emitted by the light source.

2. The thermally assisted magnetic recording system according to claim 1, wherein a pulse is emitted at a cycle twice or more an arrangement cycle of the recording units while monotonically changing the heating power by the light source, a start timing and an end timing of a signal having a same cycle as the cycle of the pulse emission appearing in the reproduction signal are detected, and the minimum heating power and the maximum heating power of recording are determined based on the start timing and the end timing.

3. The thermally assisted magnetic recording system according to claim 1, wherein the trial writing area is dispersedly provided in plurality on an entire surface of the patterned recording medium.

4. The thermally assisted magnetic recording system according to claim 1, wherein the track is divided into a plurality of sectors each having a header portion and a data recording area, and the trial writing area is provided in the header portion of the sector.

5. A thermally assisted magnetic recording system comprising:
a patterned recording medium in which a magnetic recording layer in which recording units magnetically separated from each other are arranged along a track is provided, the track is divided into a plurality of sectors each having a header portion and a data recording area, and trial writing is performed in advance in a trial writing area provided in the header portion of the sector and a heating power learning area provided in a specific track;

a thermally assisted magnetic recording head on which a magnetic recording head for applying a recording magnetic field to the patterned recording medium, a heating mechanism for heating a portion of area of the patterned recording medium by an output light from a light source, and a reproducing head are mounted;

means for controlling a heating power by the light source;

means for applying a recording magnetic field from the magnetic recording head to perform new trial writing while monotonically changing the heating power by the light source with respect to a recording unit row of the heating power learning area, and controlling the heating power by the light source such that a reproduction signal obtained by reproducing the advance trial writing recorded in the heating power learning area by the reproducing head, and a reproduction signal obtained by reproducing the new trial writing by the reproducing head correspond to each other; and means for deciding the heating power of the light source for recording user data in a sector in which the user data is to be recorded based on a reproduction signal obtained by reproducing trial writing performed in advance in a header of the sector by the reproducing head.

6. The thermally assisted magnetic recording system according to claim 5, wherein the means for deciding the heating power of the light source determines an adding amount of an LD drive current amplitude in a learning operation in the heating power learning area, and corrects determination of an optimum recording power obtained from the reproduction signal of the trial writing area by using the adding amount.

7. The thermally assisted magnetic recording system according to claim 5, wherein the trial writing is performed by emitting a pulse at a cycle twice or more an arrangement cycle of the recording units while monotonically changing the heating power by the light source.

8. A thermally assisted magnetic recording method, in which a recording magnetic field is applied to a patterned recording medium having a magnetic recording layer in which recording units magnetically separated from each other are arranged along a track and a trial writing area, and also, a portion of area of the patterned recording medium is heated by an output light from a light source to perform magnetic recording thereon, the method comprising the steps of:

performing trial writing by applying a recording magnetic field while monotonically changing a heating power by the light source with respect to a row of the recording units of the trial writing area;

reproducing the trial writing area and obtaining a reproduction signal;

determining (1) a minimum heating power of recording that is a boundary power between a heating power of recording and a heating power of non-recording, and (2) a maximum heating power of recording that is a boundary power between a heating power of recording and a heating power by which recorded information of an adjacent pattern located in a direction along the track is deleted, from the reproduction signal;

setting the heating power emitted by the light source to be a power between the minimum heating power of recording and the maximum heating power of recording; and recording user data under the set heating power.

9. The thermally assisted magnetic recording method according to claim 8, wherein, in the step of performing trial writing, a pulse is emitted at a cycle twice or more an arrangement cycle of the recording units while monotonically changing the heating power by the light source, and in the step of determining a minimum heating power and a maximum heating power of recording, a start timing and an end timing of a signal having a same cycle as the cycle of the pulse emission appearing in the reproduction signal are detected, and the minimum heating power and the maximum heating power of recording are determined based on the start timing and the end timing.

10. The thermally assisted magnetic recording method according to claim 8, wherein, in the step of performing trial writing, the trial writing is performed by emitting a pulse at a cycle twice or more an arrangement cycle of the recording units while monotonically increasing the heating power by the light source at a predetermined rate.

11. A thermally assisted magnetic recording method, in which a recording magnetic field is applied to a patterned recording medium in which a magnetic recording layer in which recording units magnetically separated from each other are arranged along a track, the track is divided into a plurality of sectors each having a header portion and a data recording area, and trial writing is performed in advance in a trial writing area provided in the header portion of the sector and a heating power learning area provided in a specific track, and also, a portion of area of the patterned recording medium is heated by an output light from a light source to perform magnetic recording thereon, the method comprising the steps of:

performing new trial writing in the heating power learning area by applying a recording magnetic field while monotonically changing a heating power by the light source with respect to a row of the recording units of the trial writing area;

controlling the heating power by the light source such that that a reproduction signal of the advance trial writing recorded in the heating power learning area, and a reproduction signal of the new trial writing correspond to each other;

reproducing trial writing performed in advance in a header of a sector in which user data is to be recorded and obtaining a reproduction signal;

deciding the heating power emitted by the light source for recording user data in the sector based on the obtained reproduction signal;

setting the heating power by the light source to the decided heating power; and recording user data under the set heating power.

12. The thermally assisted magnetic recording method according to claim 11, wherein, in the step of deciding the heating power by the light source, an adding amount of an LD drive current amplitude is determined in a learning operation in the heating power learning area, and determination of an optimum recording power obtained from the reproduction signal of the trial writing area is corrected by using the adding amount.

13. The thermally assisted magnetic recording method according to claim 11, wherein the advance trial writing is performed by emitting a pulse at a cycle twice or more an arrangement cycle of the recording units while monotonically changing the heating power by the light source.

14. The thermally assisted magnetic recording method according to claim 11, wherein the heating power learning area is provided in an inner periphery track or an outer periphery track.

* * * * *